(12) United States Patent
Severance et al.

(10) Patent No.: US 8,961,641 B2
(45) Date of Patent: Feb. 24, 2015

(54) INERTIAL GAS-LIQUID IMPACTOR SEPARATOR WITH FLOW DIRECTOR

(75) Inventors: Stephanie F. Severance, Stoughton, WI (US); Daniel Y. Hodges, Verona, WI (US); Hamilton E. Harper, Madison, WI (US); Benjamin L. Scheckel, Stoughton, WI (US); Roger L. Zoch, McFarland, WI (US); Merwyn I. Coutinho, Cookeville, TN (US); Brian W. Schwandt, Fort Atkinson, WI (US)

(73) Assignee: Cummins Filtration IP Inc., Columbus, IN (US)

( * ) Notice: Subject to any disclaimer, the term of this patent is extended or adjusted under 35 U.S.C. 154(b) by 308 days.

(21) Appl. No.: 13/441,046

(22) Filed: Apr. 6, 2012

(65) Prior Publication Data

US 2012/0192536 A1 Aug. 2, 2012

Related U.S. Application Data

(62) Division of application No. 12/622,743, filed on Nov. 20, 2009, now Pat. No. 8,152,884.

(51) Int. Cl.
*B01D 45/08* (2006.01)

(52) U.S. Cl.
CPC . *B01D 45/08* (2013.01); *Y10S 55/14* (2013.01)
USPC .................................. 55/465; 55/DIG. 14

(58) Field of Classification Search
USPC ........ 55/462, 465, DIG. 14; 73/28.05, 863.22
See application file for complete search history.

(56) References Cited

U.S. PATENT DOCUMENTS

| | | | |
|---|---|---|---|
| 3,261,925 A | 7/1966 | Smith | |
| 4,012,209 A | 3/1977 | McDowell et al. | |
| 5,129,371 A | 7/1992 | Rosalik, Jr. | |
| 5,562,087 A | 10/1996 | Wright | |
| 5,564,401 A | 10/1996 | Dickson | |
| 6,279,556 B1 | 8/2001 | Busen et al. | |
| 6,290,738 B1 | 9/2001 | Holm | |
| 6,293,268 B1 | 9/2001 | Mammarella | |
| 6,418,918 B2 | 7/2002 | Mammarella | |
| 6,505,615 B2 | 1/2003 | Pietschner | |
| 6,626,163 B1 | 9/2003 | Busen et al. | |
| 6,684,864 B1 | 2/2004 | Busen et al. | |
| 6,797,040 B2 | 9/2004 | Lenzing | |
| 7,080,636 B2 | 7/2006 | Knaus et al. | |
| 7,238,216 B2 | 7/2007 | Malgorn et al. | |
| 7,473,291 B2 | 1/2009 | Evenstad et al. | |
| 7,828,865 B2 | 11/2010 | Hodges et al. | |

(Continued)

FOREIGN PATENT DOCUMENTS

DE 1544126 6/1969
DE 10320215 9/2004

(Continued)

OTHER PUBLICATIONS

Highly Efficient Oil Separation for Minimised Oil Carry Over, MTZ0412008, vol. 69, pp. 32-27.

*Primary Examiner* — Robert A Hopkins
(74) *Attorney, Agent, or Firm* — Foley & Lardner LLP

(57) ABSTRACT

An inertial gas-liquid impactor separator includes flow director guidance structure directing and guiding flow through the housing from the inlet to the outlet along a flow path from upstream to downstream. The flow director guidance structure may include a flow controller controlling and directing flow.

23 Claims, 17 Drawing Sheets

(56) References Cited

U.S. PATENT DOCUMENTS

| | | |
|---|---|---|
| 7,896,946 B1 | 3/2011 | Steffen et al. |
| 7,964,009 B2 | 6/2011 | Herman et al. |
| 8,075,654 B2 | 12/2011 | Holzmann et al. |
| 2007/0256566 A1 | 11/2007 | Faber et al. |
| 2008/0264018 A1 | 10/2008 | Herman |
| 2009/0100811 A1 | 4/2009 | Scheckel et al. |
| 2009/0114088 A1 | 5/2009 | Evenstad et al. |
| 2009/0120854 A1 | 5/2009 | Parikh et al. |
| 2009/0193770 A1 | 8/2009 | Holzmann et al. |
| 2010/0024366 A1 | 2/2010 | Hodges et al. |
| 2010/0101425 A1 | 4/2010 | Herman et al. |

FOREIGN PATENT DOCUMENTS

| | | |
|---|---|---|
| EP | 0754840 | 1/1997 |
| WO | 2007000281 | 1/2007 |
| WO | 2007028351 | 3/2007 |
| WO | 2007137934 | 12/2007 |
| WO | 2007138008 | 12/2007 |

INERTIAL GAS-LIQUID IMPACTOR SEPARATOR WITH FLOW DIRECTOR

CROSS REFERENCE TO RELATED APPLICATION

This application is a division of U.S. patent application Ser. No. 12/622,743, filed Nov. 20, 2009, now U.S. Pat. No. 8,152,884.

BACKGROUND AND SUMMARY

The invention relates to inertial gas-liquid impactor separators for removing liquid particles from a gas-liquid stream, including in engine crankcase ventilation separation applications, including closed crankcase ventilation (CCV), and open crankcase ventilation (OCV) systems.

Inertial gas-liquid impactor separators are known in the prior art. Liquid particles are removed from a gas-liquid stream by accelerating the stream or aerosol to high velocities through nozzles or orifices and directing same against an impactor, typically causing a sharp directional change, effecting the noted liquid particle separation. Such inertial impactors have various uses, including in oil separation applications for blowby gases from the crankcase of an internal combustion engine.

The present invention arose during continuing development efforts in the above technology.

BRIEF DESCRIPTION OF THE DRAWINGS

Prior Art

FIG. 1 is a schematic side sectional view of an inertial gas-liquid separator in an engine crankcase ventilation separation application.

FIG. 2 is like FIG. 1 and shows another embodiment.
FIG. 3 is like FIG. 1 and shows another embodiment.
FIG. 4 is like FIG. 1 and shows another embodiment.
FIG. 5 is like FIG. 1 and shows another embodiment.
FIG. 6 shows a further embodiment.

Present Application

Figure 7:
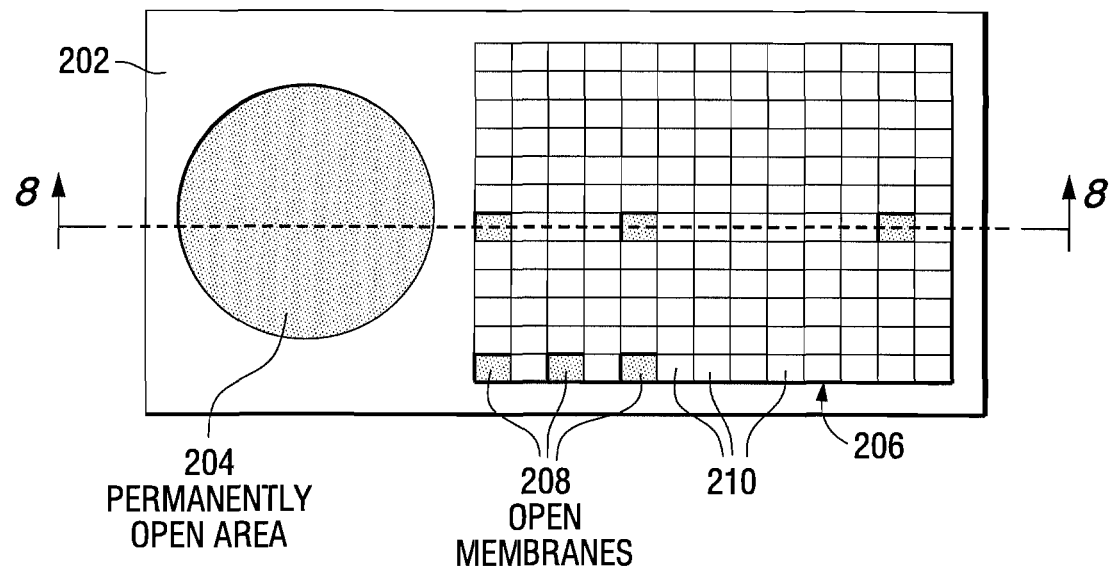

FIG. 7 is a top plan view of a flow director for an inertial gas-liquid impactor separator in accordance with the invention.

Figure 8:
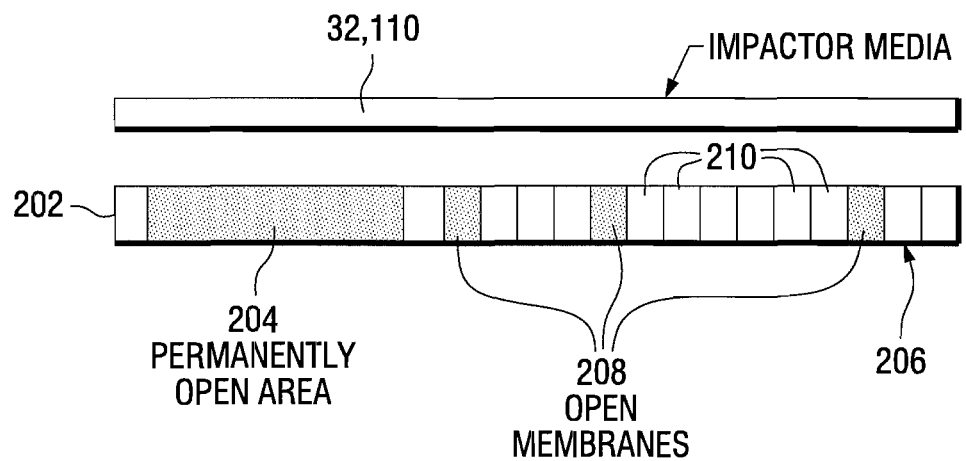

FIG. 8 is a sectional view taken along line 8-8 of FIG. 7.

Figure 9:
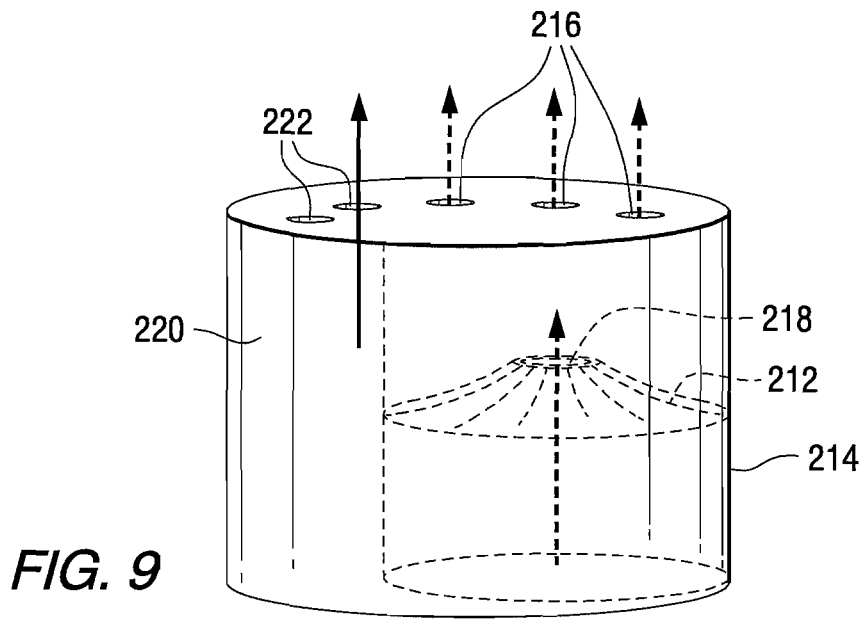

FIG. 9 is a schematic perspective view showing another embodiment of a flow director for an inertial gas-liquid impactor separator in accordance with the invention.

Figure 10:
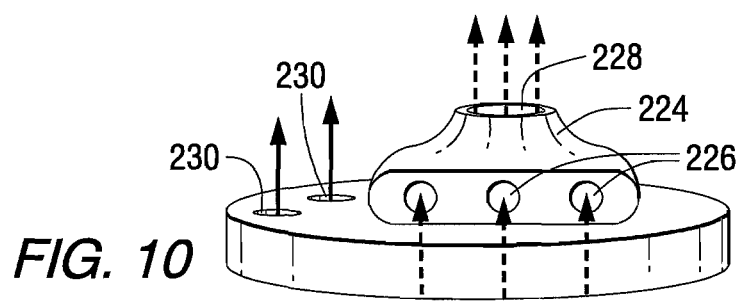
Figure 11:
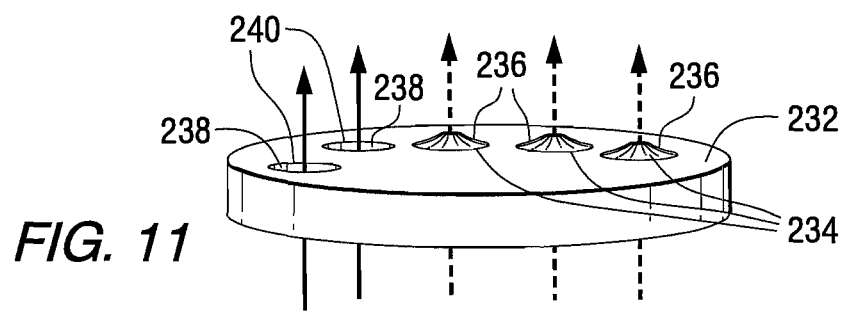
Figure 12:
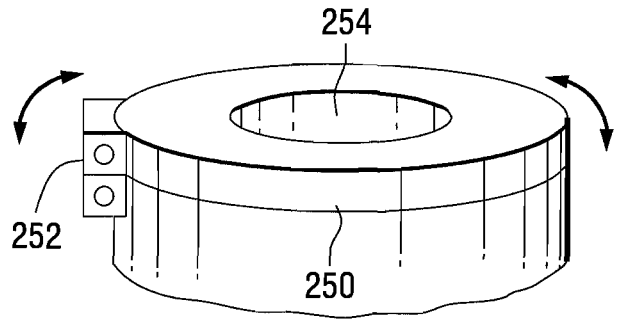

FIG. 10 is like FIG. 9 and shows a further embodiment.
FIG. 11 is like FIG. 10 and shows a further embodiment.
FIG. 12 is a perspective view of another embodiment of a flow director for an inertial gas-liquid impactor separator in accordance with the invention.

Figure 13:
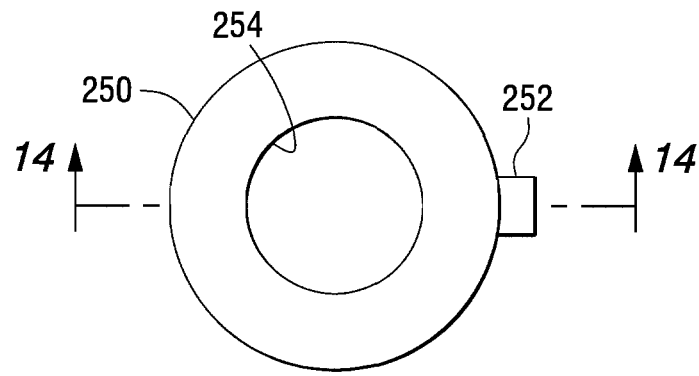
Figure 14:
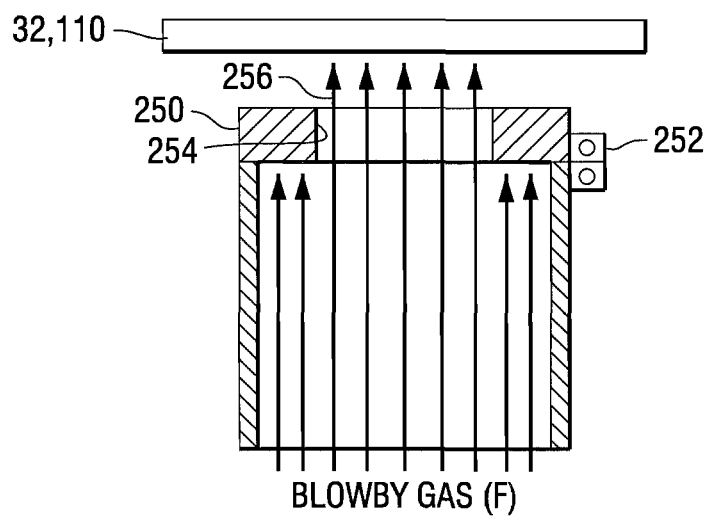

FIG. 13 is a top plan view of the component of FIG. 12.
FIG. 14 is a sectional view taken along line 14-14 of FIG. 13.

Figure 15:
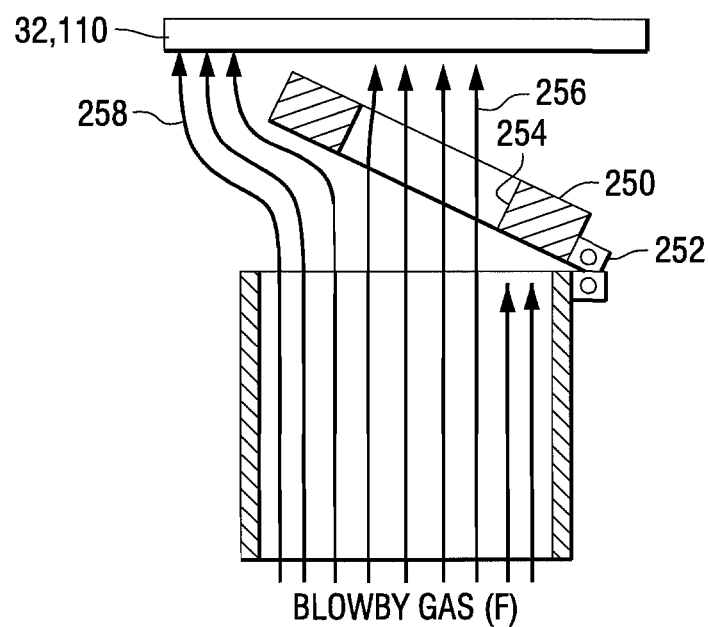

FIG. 15 is like FIG. 14 and shows a further operational condition.

Figure 16:
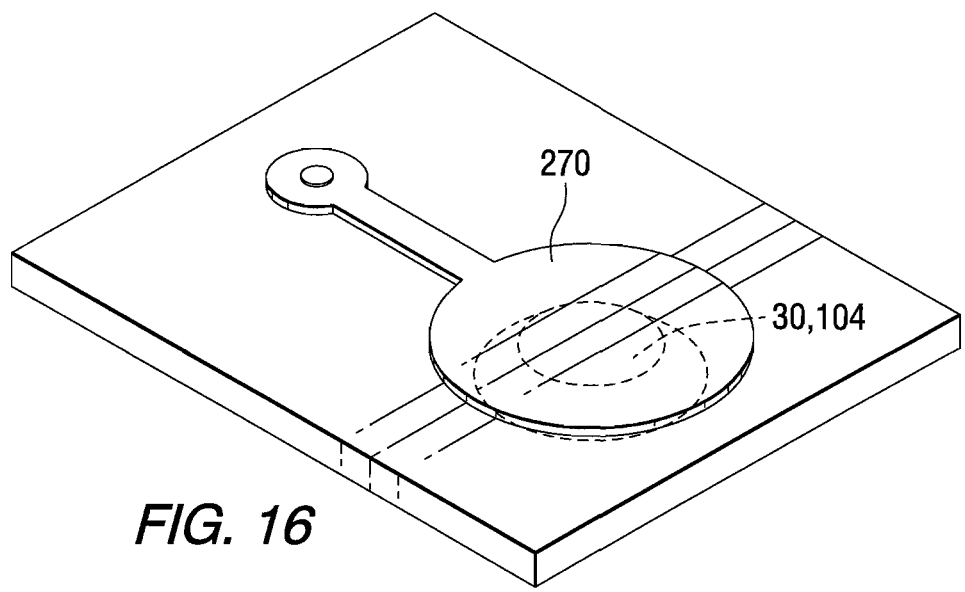

FIG. 16 is a schematic perspective view of another embodiment of a flow director for an inertial gas-liquid impactor separator in accordance with the invention.

Figure 17:
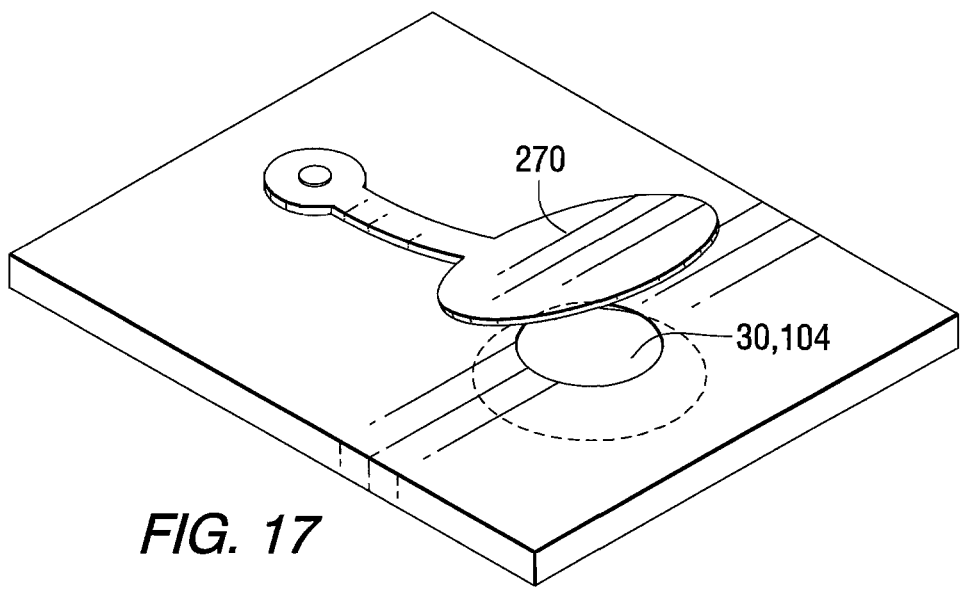

FIG. 17 is like FIG. 16 and shows a further operational condition.

Figure 18:
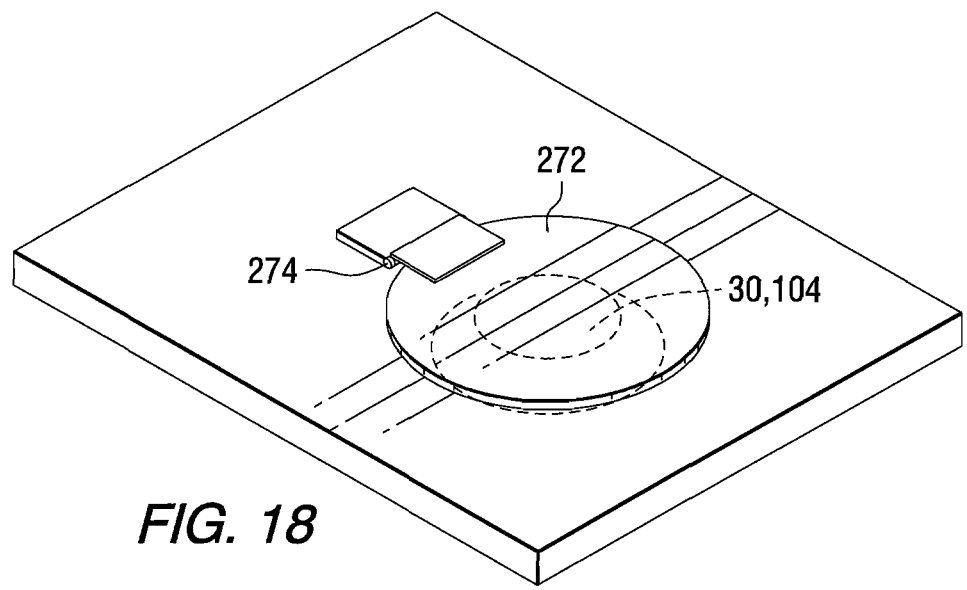
Figure 19:
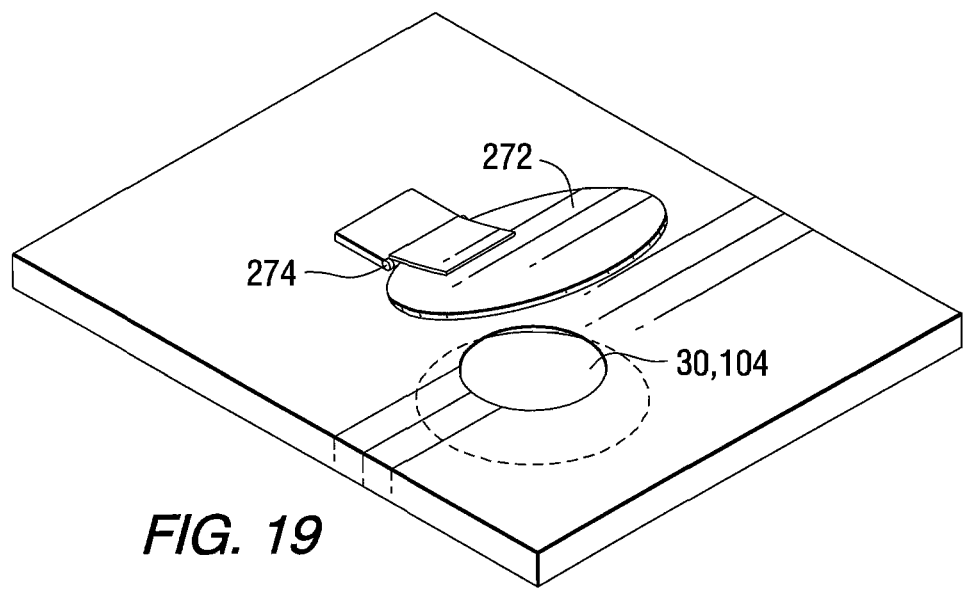

FIG. 18 is like FIG. 16 and shows another embodiment.
FIG. 19 is like FIG. 18 and shows a further operational condition.

Figure 20:
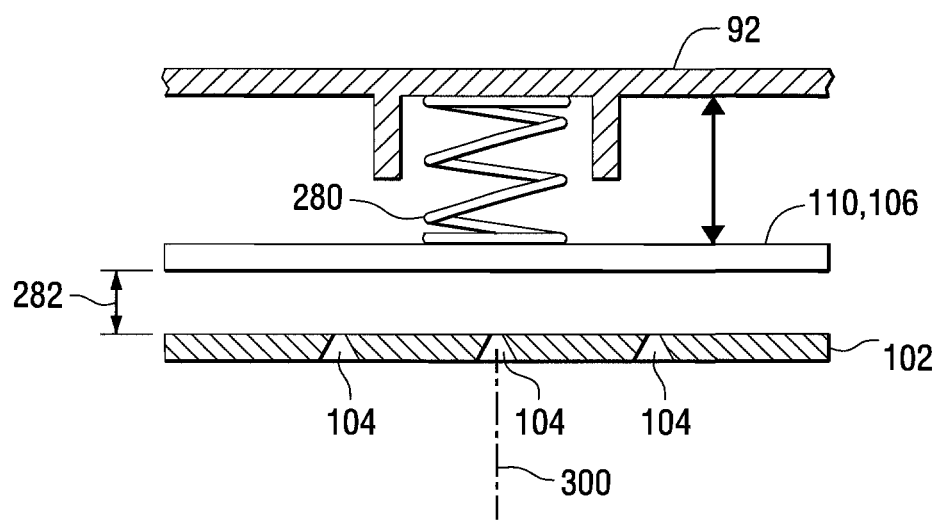

FIG. 20 is a schematic sectional view of another embodiment of a flow director for an inertial gas-liquid impactor separator in accordance with the invention.

Figure 21:
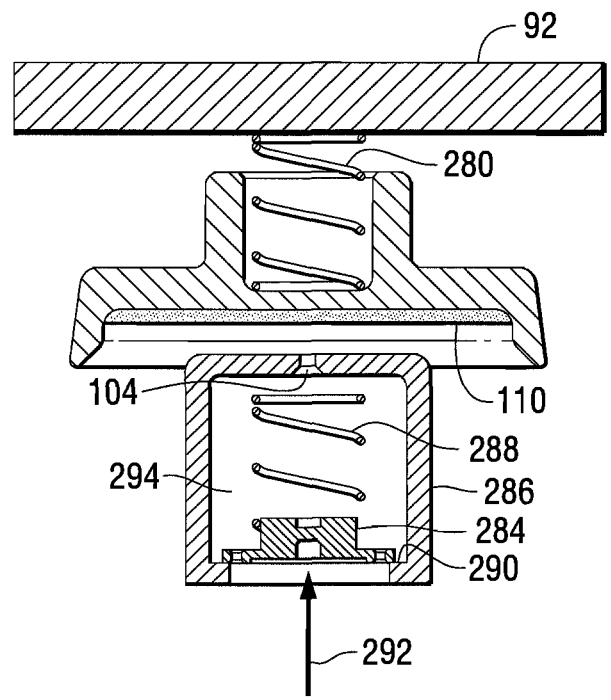

FIG. 21 is a schematic sectional view of another embodiment of a flow director for an inertial gas-liquid impactor separator in accordance with the invention.

Figure 22:
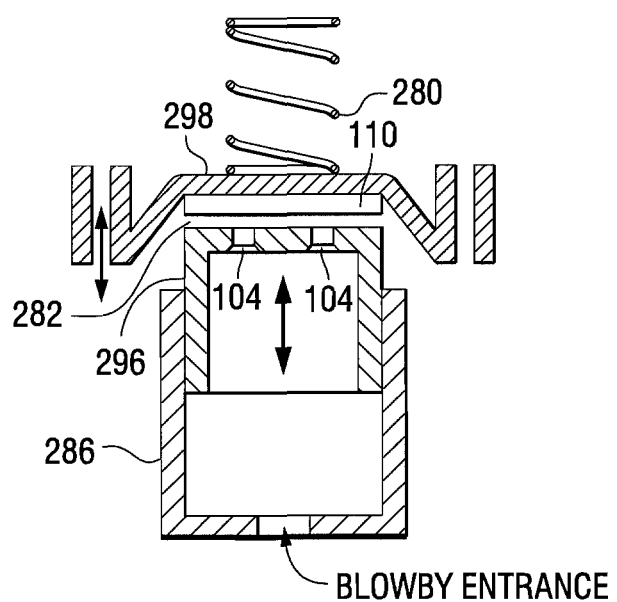
Figure 23:
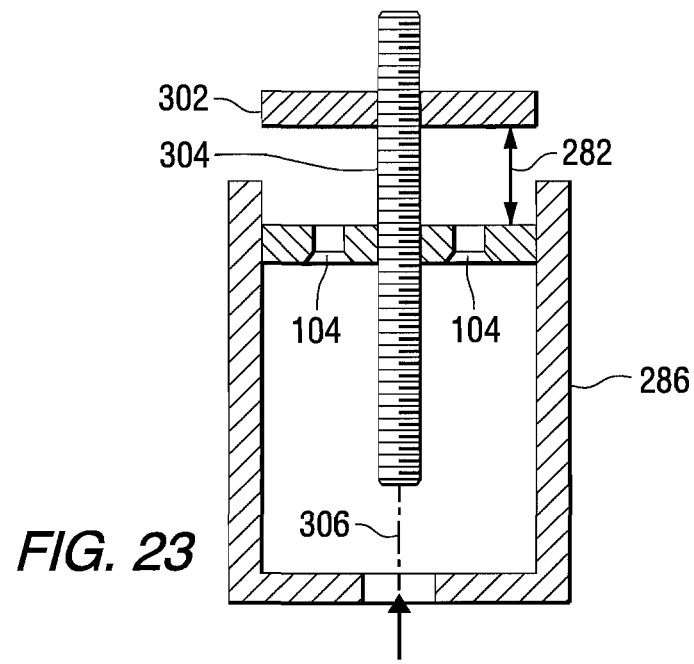
Figure 24:
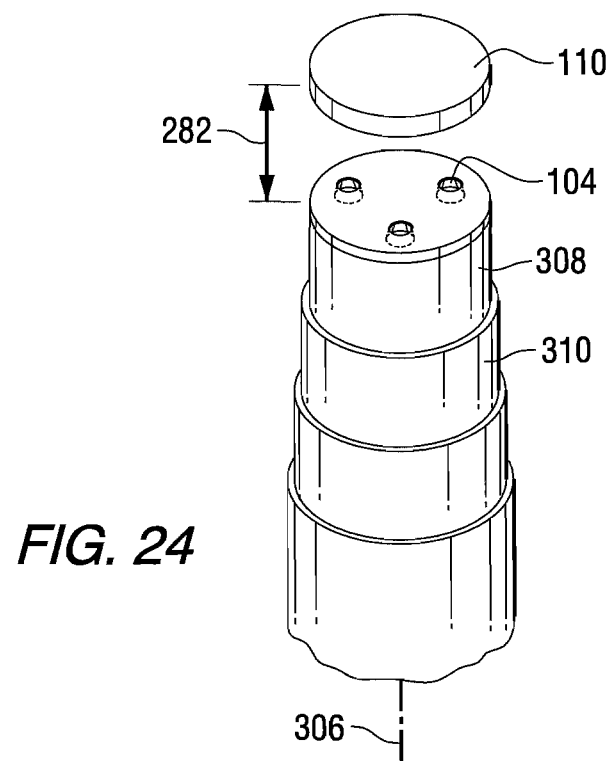
Figure 25:
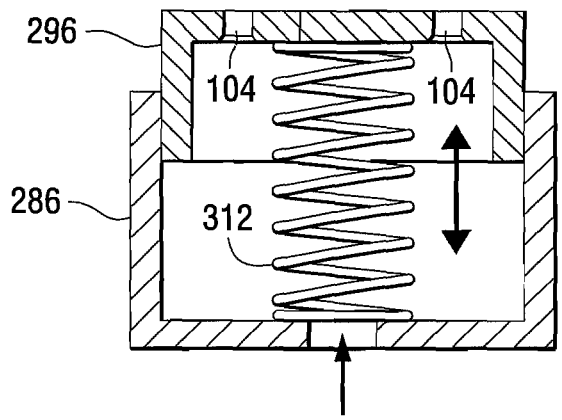

FIG. 22 is like FIG. 21 and shows another embodiment.
FIG. 23 is like FIG. 22 and shows another embodiment.
FIG. 24 is like FIG. 23 and shows another embodiment.
FIG. 25 is like FIG. 22 and shows another embodiment.

Figure 26:
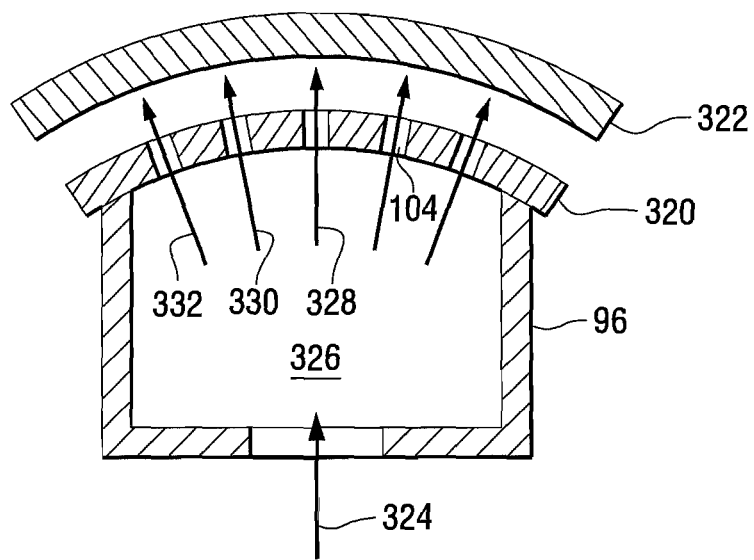

FIG. 26 is a schematic sectional view showing another embodiment of a flow director for an inertial gas-liquid impactor separator in accordance with the invention.

Figure 27:
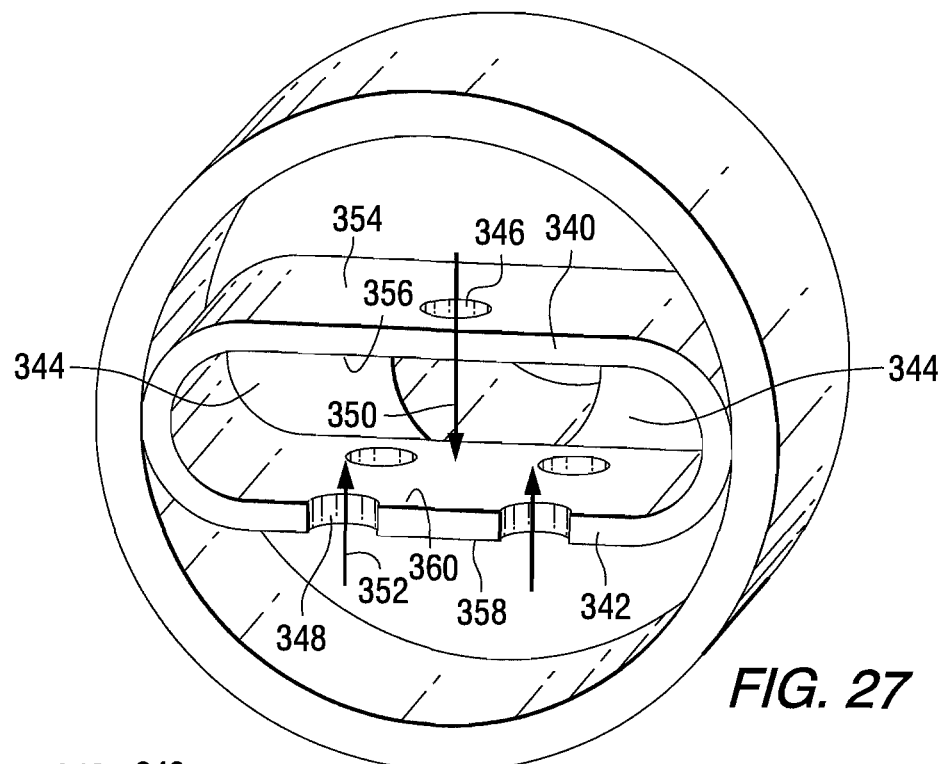

FIG. 27 is a schematic perspective view of another embodiment of a flow director for an inertial gas-liquid impactor separator in accordance with the invention.

Figure 28:
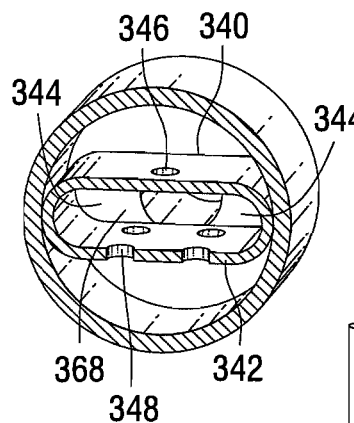

FIG. 28 is like FIG. 27, showing a perspective cut-away view.

Figure 29:
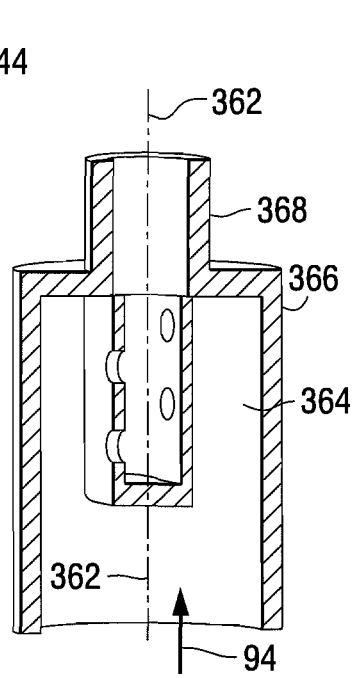

FIG. 29 is another perspective cut-away view of the component of FIG. 28.

Figure 30:
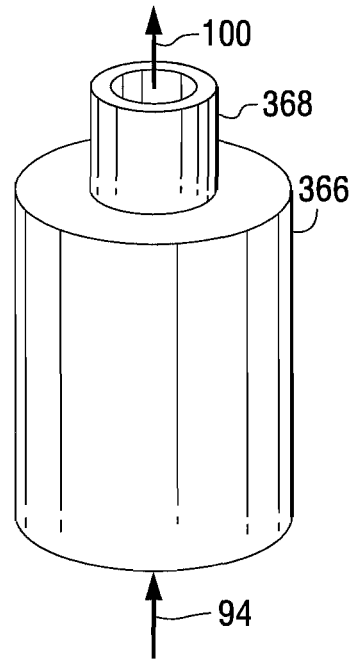

FIG. 30 is a perspective view of the component of FIG. 29.

Figure 31:
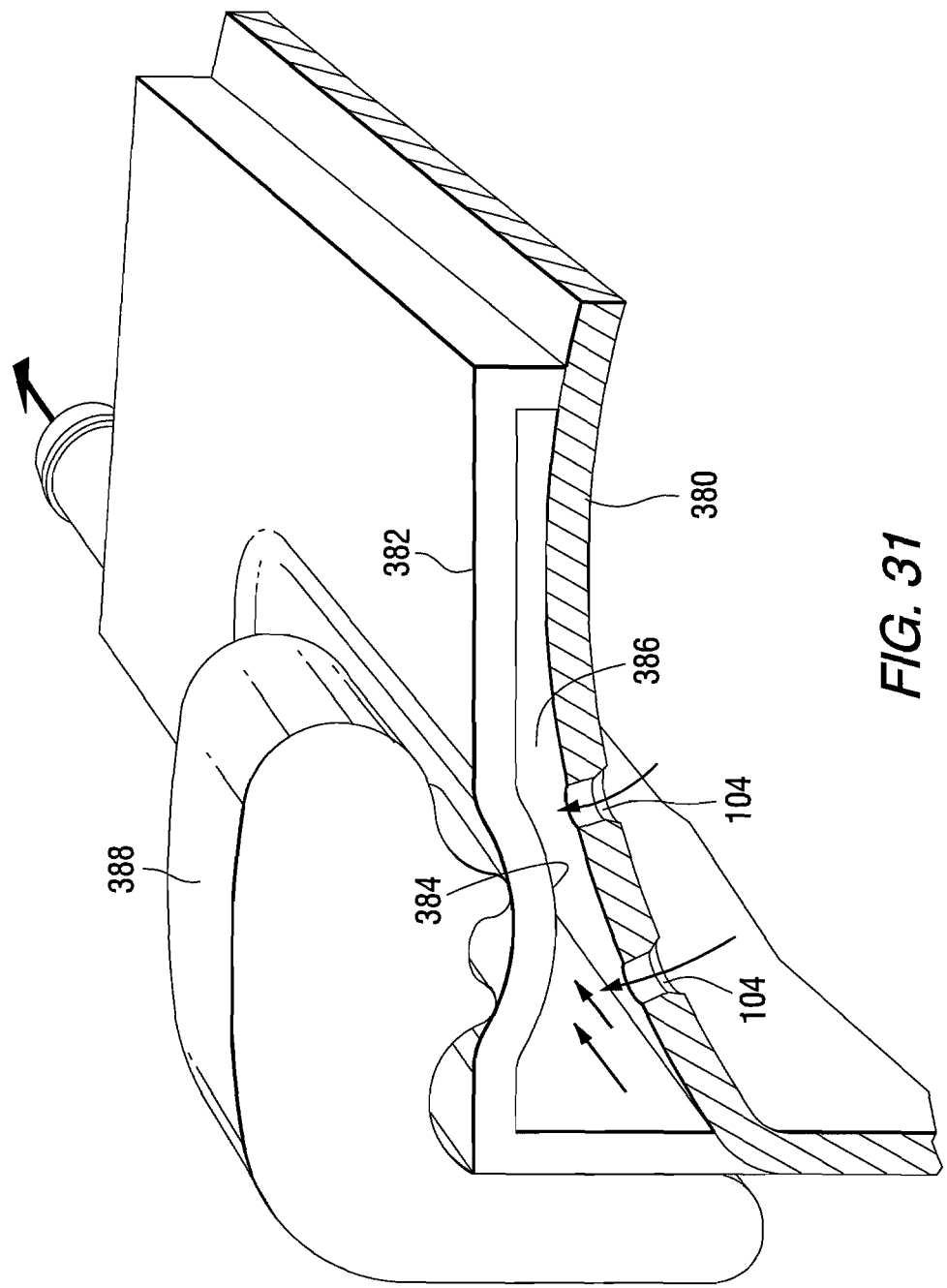

FIG. 31 is a schematic sectional perspective view of another embodiment of a flow director for an inertial gas-liquid impactor separator in accordance with the invention.

Figure 32:
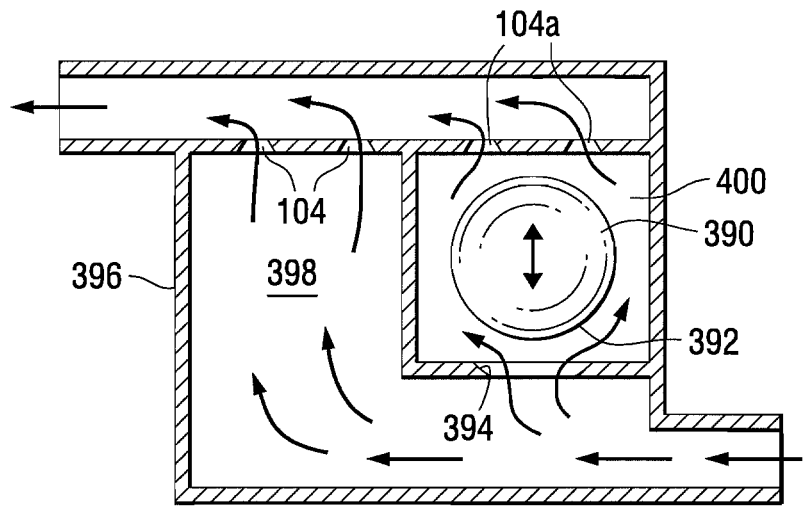

FIG. 32 is a schematic sectional view of another embodiment of a flow director for an inertial gas-liquid impactor separator in accordance with invention.

Figure 33:
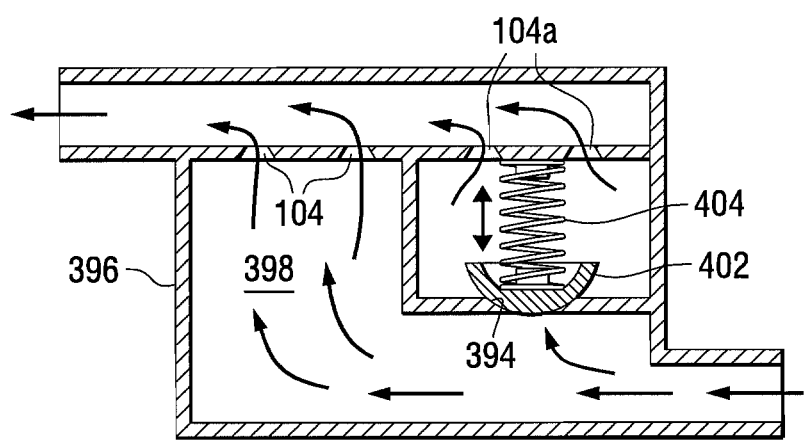
Figure 34:
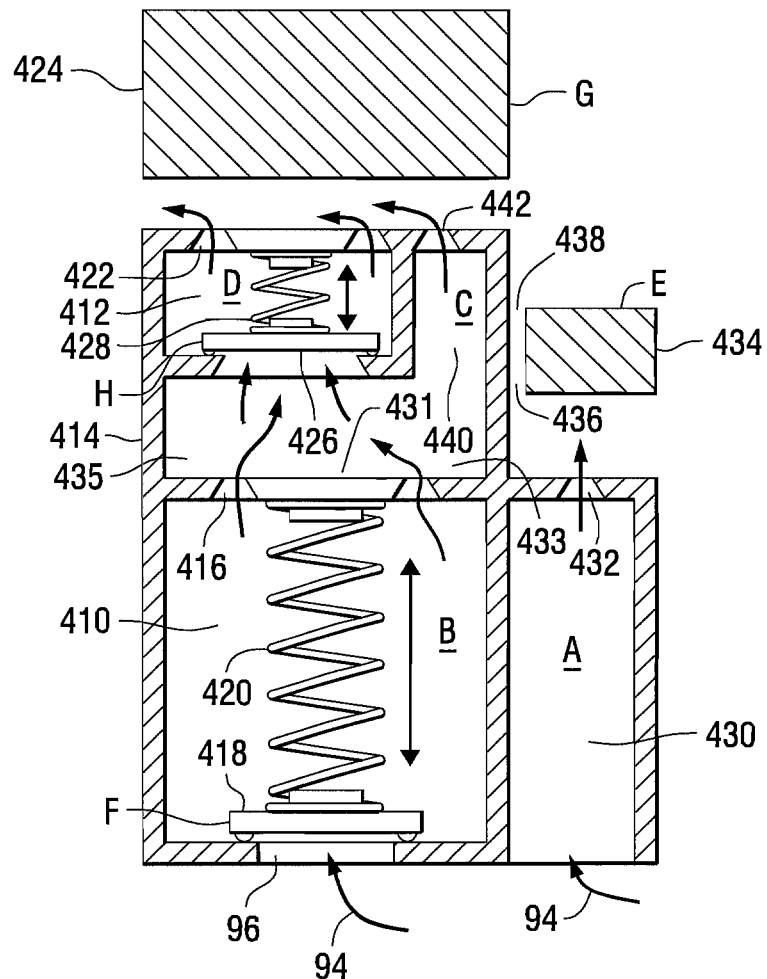

FIG. 33 is like FIG. 32 and shows another embodiment.
FIG. 34 is a schematic sectional view of another embodiment of a flow director for an inertial gas-liquid impactor separator in accordance with the invention.

DETAILED DESCRIPTION

Prior Art

The following description of FIGS. 1-6 is taken from the above noted incorporated U.S. Pat. No. 6,290,738.

Figure 1:
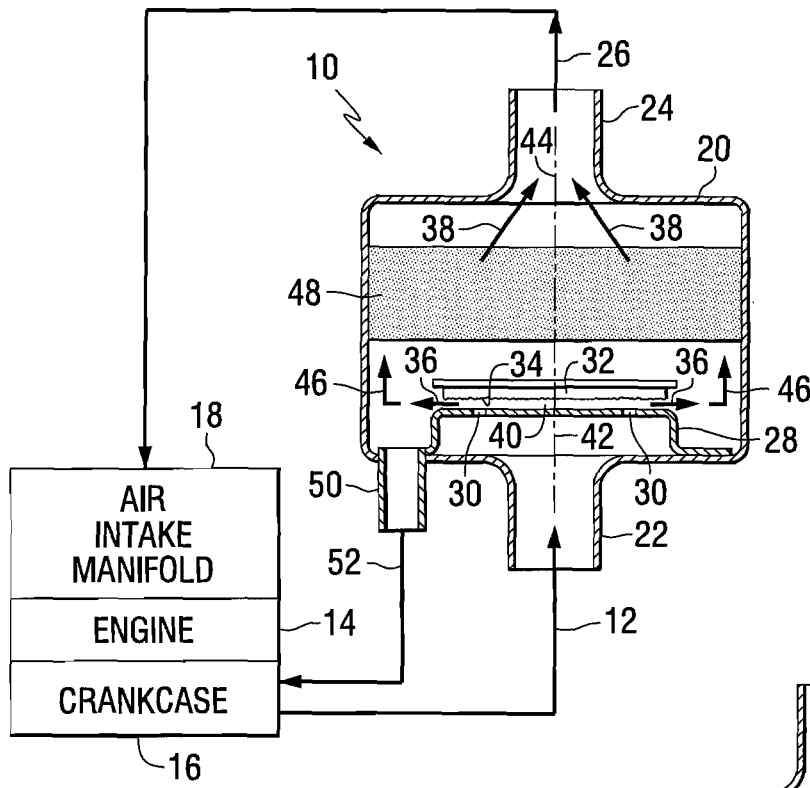
FIGS. 1-6 are taken from U.S. Pat. No. 6,290,738, incorporated herein by reference.

FIG. 1 shows an inertial gas-liquid separator 10 for removing and coalescing liquid particles from a gas-liquid stream 12, and shown in an exemplary crankcase ventilation separation application for an internal combustion engine 14. In such application, it is desired to vent combustion blow-by gases from crankcase 16 of engine 14. Untreated, these gases contain particulate matter in the form of oil mist and soot. It is desirable to control the concentration of the contaminants, especially if the blow-by gases are to be recirculated back into the engine's air intake system, for example at air intake manifold 18. The oil mist droplets are generally less than 5 microns in diameter, and hence are difficult to remove using conventional fibrous filter media while at the same time maintaining low flow resistance as the media collects and becomes saturated with oil and contaminants.

Separator 10 includes a housing 20 having an inlet 22 for receiving gas-liquid stream 12 from engine crankcase 16, and an outlet 24 for discharging a gas stream 26 to air intake manifold 18. Nozzle structure 28 in the housing has a plurality of nozzles or holes 30 receiving the gas-liquid stream from inlet 22 and accelerating the gas-liquid stream through nozzles 30. An inertial collector 32 in the housing is in the path of the accelerated gas-liquid stream and causes a sharp directional change thereof as shown at 36. Collector 32 has a rough porous collection or impingement surface 34 causing liquid particle separation from the gas-liquid stream of smaller size liquid particles than a smooth non-porous impactor impingement surface and without the sharp cut-off size of the latter. The use of a rough porous collection surface is contrary to typical inertial gas-liquid separators, but is intentional in the present invention, for the above noted reasons, and as further noted herein.

The noted rough porous collection surface improves overall separation efficiency including for liquid particles smaller than the cut-off size of a smooth non-porous impactor impingement surface. The rough porous collection surface causes both: a) liquid particle separation from the gas-liquid stream; and b) collection of the liquid particles within the collection surface. The rough porous collection surface has a cut-off size for particle separation which is not as sharp as that of a smooth non-porous impactor impingement surface but improves collection efficiency for particles smaller than the cut-off size as well as a reduction in cut-off size. The rough porous collection surface provides a coalescing medium, such that liquid particles, once captured within the collection surface, will coalesce with other liquid particles in the collection surface, and such that the accelerated gas stream and resultant high velocity of gas at and within the collection surface creates drag forces sufficient to cause captured liquid to migrate to outer edges of the collection surface and shed off of the collector. After the noted sharp directional change, outlet 24 receives the gas stream, as shown at 38, absent the separated liquid particles. Collection surface 34 and nozzles 30 are separated by a gap 40 sufficient to avoid excessive restriction. Housing 20 has a flow path therethrough including a first flow path portion 42 for the gas-liquid stream between inlet 22 and gap 40, and a second flow path portion 44 for the gas stream between gap 40 and outlet 24. The flow path through housing 20 has a directional change in gap 40 at collection surface 34, and another directional change in the noted second flow path portion, as shown at 46.

A pass-through filter 48, FIG. 1, in the noted second flow path portion provides a back-up safety filter trapping liquid particles re-entrained in the gas stream after separation at inertial collector 32. Drain 50 in the housing drains separated fluid from the collector. In FIG. 1, drain 50 drains the separated fluid externally of housing 20 as shown at 52 back to crankcase 16. Drain 50 is gravitationally below and on the opposite side of collector 32 from pass-through filter 48. In FIG. 1, gas stream 26 flows along a vertical axial direction. Filter 48 extends along a radial left-right horizontal span perpendicular to the noted axial vertical direction. The noted radial horizontal span of pass-through filter 48 extends across the entire housing and is parallel to collection surface 34. The gas stream flows radially at 36 along and parallel to collection surface 34 after separation and then turns 90° as shown at 46 and flows through pass-through filter 48 to outlet 24 as shown at 38.

Figure 2:
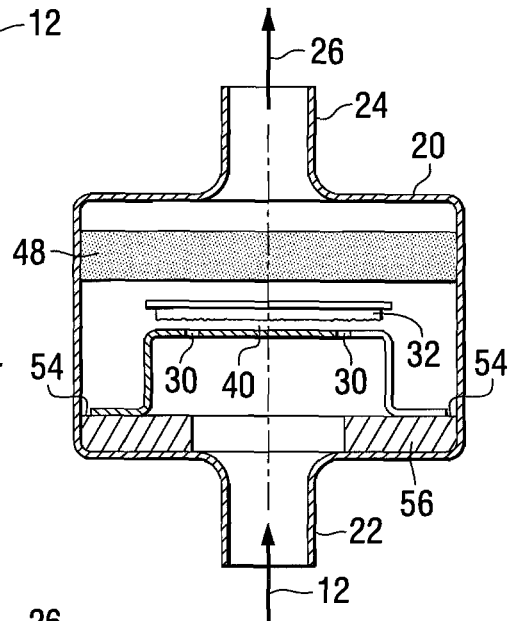

FIG. 2 is similar to FIG. 1 and uses like reference numerals where appropriate to facilitate understanding. In FIG. 2, drain 54 drains separated fluid back to inlet 22. A second pass-through filter 56 in the housing is gravitationally below and on the opposite side of collector 32 from pass-through filter 48 and filters separated liquid from collector 32. Drain 54 drains filtered fluid through pass-through filter 56 to inlet 22.

Drain 54 in FIG. 2 is also a bypass port through which gas-liquid stream 12 may flow to gap 40 without being accelerated through nozzles 30. The gas-liquid stream from inlet 22 thus has a main flow path through nozzles 30 and accelerated through gap 40 against collector 32, and an alternate flow path through filter 56 and bypass port 54 to gap 40. Pass-through filter 56 in the noted alternate flow path traps and coalesces liquid in the gas-liquid stream from inlet 22 to remove liquid from the gas stream supplied to outlet 24 through the noted alternate flow path. Outlet 24 thus receives a gas stream from the noted main flow path with liquid removed by collector 32, and also receives a gas stream from the noted alternate flow path with liquid removed by pass-through filter 56. Inlet 22 is gravitationally below pass-through filter 56. Liquid removed by pass-through filter 56 from the gas-liquid stream in the noted alternate flow path thus drains to inlet 22. Pass-through filter 56 also filters liquid removed from the gas-liquid stream in the noted main flow path by collector 32 and drains such liquid through drain 54 and filter 56 back to inlet 22.

Figure 3:
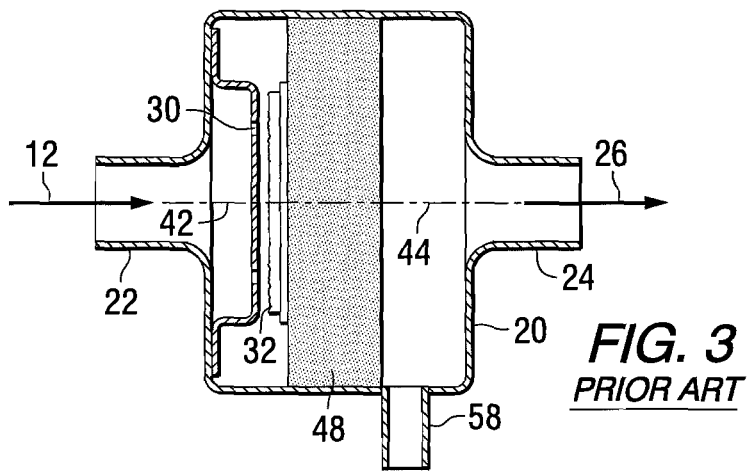

FIG. 3 uses like reference numerals from above where appropriate to facilitate understanding. In FIG. 3, the axial flow of the gas stream through the housing is horizontal. Drain 58 in the housing drains separated fluid from the collector externally of the housing back to crankcase 16. Drain 58 is in the noted second flow path portion 44 and drains separated fluid from collector 32 through pass-through filter 48 such that the latter filters both gas stream 26 and the separated fluid. Drain 58 is between pass-through filter 48 and outlet 24, and is gravitationally below collector 32 and outlet 24 and pass-through filter 48.

Figure 4:
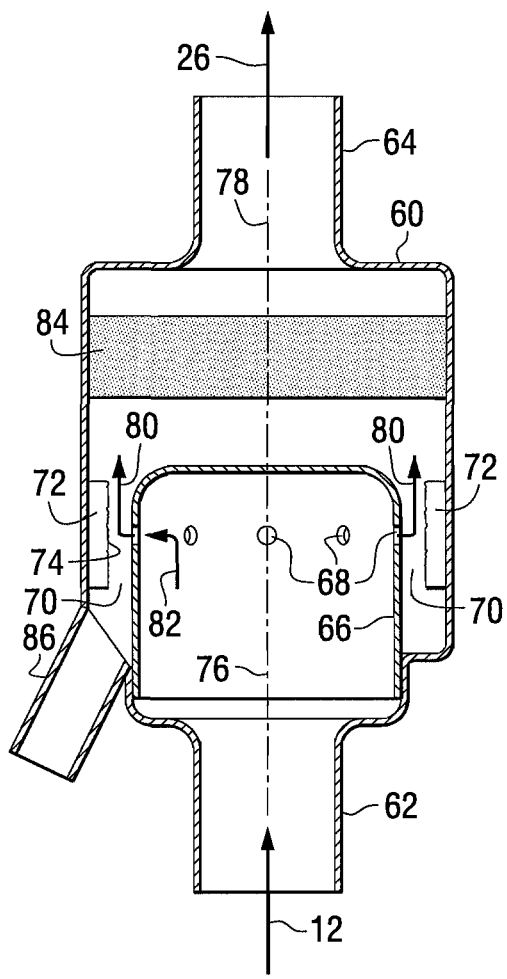

FIG. 4 uses like reference numbers from above where appropriate to facilitate understanding. FIG. 4 shows a vertical orientation of gas flow axially through a housing 60 having an inlet 62 for receiving gas-liquid stream 12, and an outlet 64 for discharging gas stream 26. Nozzle structure 66 in the housing has a plurality of nozzles or holes 68 receiving the gas-liquid stream from inlet 62 and accelerating the gas-liquid stream radially horizontally through nozzles 68 and radially through annular gap 70 to impinge annular inertial collector 72. Collector 72 is in the path of the accelerated gas-liquid stream and causes a sharp directional change thereof and has a rough porous collection surface 74, as above. The housing has a vertical axial flow path therethrough including a first flow path portion 76 for the gas-liquid stream between inlet 62 and gap 70, and a second flow path portion 78 for the gas stream between gap 70 and outlet 64. The flow path has a directional change 80 in gap 70 at collection surface 74, and a directional change 82 in flow path portion 76. Each of directional changes 82 and 80 is 90°. Pass-through filter 84 in flow path portion 78 in the housing provides a back-up safety filter trapping liquid particles re-entrained in the gas stream after separation at inertial collector 72. Filter 84 extends horizontally along a radial span relative to the noted vertical axial direction. The radial horizontal span of filter 84 extends across the entire housing and is perpendicular to collection surface 74. After the noted directional change 80, the gas stream flows axially along and parallel to collection surface 74 and then flows axially through pass-through filter 84 to outlet 64. Drain 86 in housing 60 drains separated fluid from collector 72 externally of the housing back to engine crankcase 16. Drain 86 is gravitationally below and on the opposite side of collector 72 from pass-through filter 84.

Figure 5:
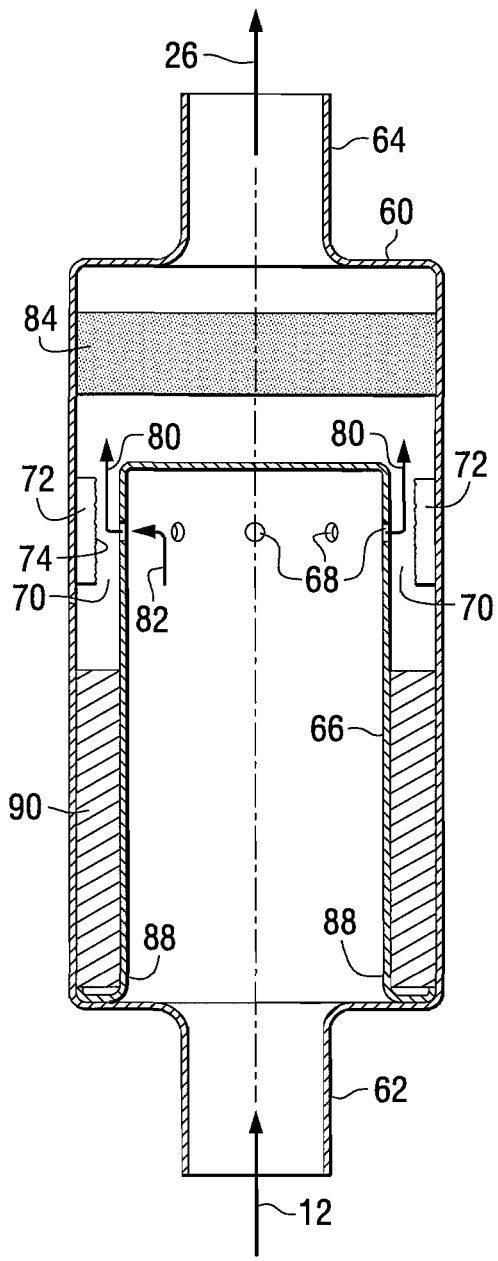

FIG. 5 is similar to FIG. 4 and uses like reference numerals where appropriate to facilitate understanding. In FIG. 5, drain 88 in the housing drains separated fluid from collector 72 to inlet 62. Drain 88 is gravitationally below and on the opposite side of collector 72 from pass-through filter 84. A second pass-through filter 90 in the housing is gravitationally below and on the opposite side of collector 72 from pass-through filter 84 and filters separated fluid from collector 72 drained through drain 88 to inlet 62. The drain is provided by a plurality of holes or ports 88 in nozzle structure 66.

Ports 88 in FIG. 5 are also bypass ports through which gas-liquid stream 12 may flow to gap 70 without being accelerated through nozzles 68. The gas-liquid stream from inlet 62 thus has a main flow path through nozzles 68 and accelerated through gap 70 against collector 72, and an alternate flow path through bypass ports 88 and filter 90 to gap 70. Pass-through filter 90 in the noted alternate flow path traps and coalesces liquid in the gas-liquid stream to remove liquid from the gas stream supplied to outlet 64. Outlet 64 thus receives a gas stream from the noted main flow path with liquid removed by collector 72, and receives a gas stream from the noted alternate flow path with liquid removed by pass-through filter 90. Inlet 62 is gravitationally below pass-through filter 90. Liquid removed by pass-through filter 90 from the gas-liquid stream in the noted alternate flow path thus drains through drain or bypass ports 88 to inlet 62. Pass-through filter 90 also filters liquid removed from the gas-liquid stream in the noted main flow path by collector 72 and drains such liquid back through drain 88 to inlet 62.

Figure 6:
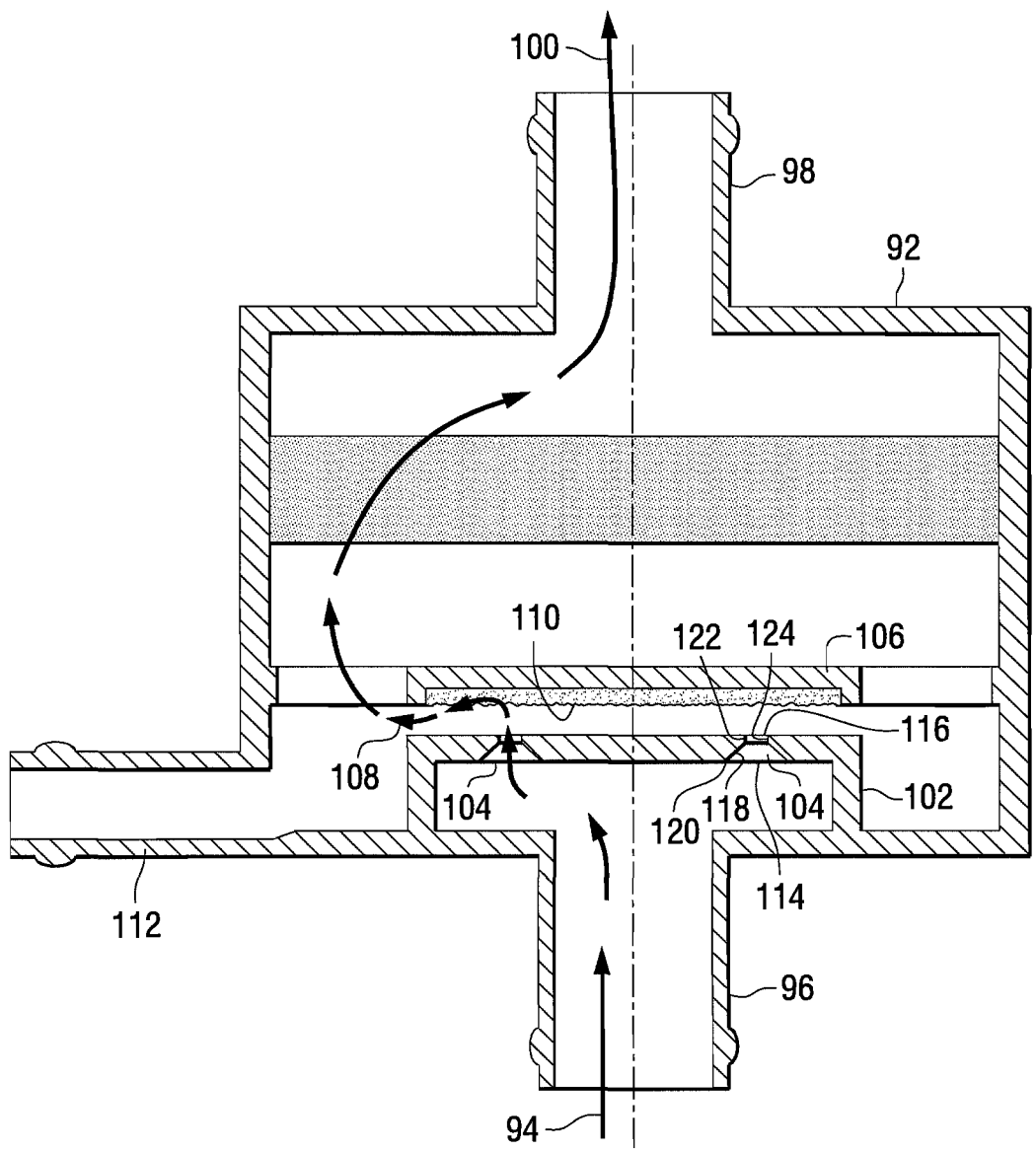

FIG. 6 shows an inertial gas-liquid separator 92 for removing and coalescing liquid particles from a gas-liquid stream 94. Housing 92 has an inlet 96 for receiving gas-liquid stream 94, and an outlet 98 for discharging a gas stream 100. Nozzle structure 102 in the housing has a plurality of nozzles 104 receiving the gas-liquid stream from inlet 96 and accelerating the gas-liquid stream through the nozzles. An inertial collector 106 in the housing in the path of the accelerated gas-liquid stream causes a sharp directional change thereof as shown at 108. The collector has a rough porous collection surface 110 causing liquid particle separation from the gas-liquid stream. Drain 112 in the housing drains separated fluid from the collector back to crankcase 16.

Nozzles 104 in FIG. 6 have an upstream entrance opening 114, and a downstream exit opening 116. Entrance opening 114 is larger than exit opening 116. The nozzles have a frusto-conical tapered transition section 118 between the entrance and exit openings. The frusto-conical tapered transition section has an upstream end 120 of a first diameter at entrance opening 114, and has a downstream end 122 of a second diameter smaller than the noted first diameter. Downstream end 122 of frusto-conical tapered transition section 118 is spaced from exit opening 116 by a second transition section 124 of constant diameter equal to the noted second diameter.

In one embodiment, collection surface 34, FIGS. 1-3, 74, FIGS. 4 and 5, 110, FIG. 6, is a fibrous collection surface comprising a plurality of layers of fibers. At least two or three layers of fibers are desirable and provide improved performance. In the preferred embodiment, at least one hundred layers of fibers are provided. The fibers have a diameter at least three times the diameter of the liquid particles to be separated and captured. In preferred form, the fiber diameter is in the range of 50 to 500 microns. For oil mist droplets in the range from 0.3 microns to 3 microns, with a 1.7 micron average, particle separation efficiency improved to 85% mass efficiency with the noted fibrous collection surface, as comparing to 50% mass efficiency for a smooth non-porous collection surface.

In another embodiment, the collection surface is a porous collection surface of porosity between 50% and 99.9%. The average pore size is at least five to ten times the diameter of the liquid particles, and preferably at least 25 to 50 microns.

In another embodiment, the collection surface is a rough collection surface having a roughness measured in peak-to-valley height of at least ten times the diameter of the liquid particles. The peak to valley height is measured parallel to the direction of gas-liquid flow from the nozzles to the collection surface. The peak-to-valley height is preferably at least 10 microns.

Present Application

The present application is directed to an inertial gas-liquid impactor separator 10 for removing liquid particles from a gas-liquid stream 12, FIG. 1, 94, FIG. 6, as above, including a housing 20, 92 having an inlet 22, 96 for receiving gas-liquid stream 12, 94, and an outlet 24, 98 for discharging a gas stream 26, 100. A nozzle structure or plate 28, 102 has at least one and preferably a plurality of nozzles or orifices or holes 30, FIG. 1, 104, FIG. 6, receiving the gas-liquid stream from the inlet and accelerating the gas-liquid stream through the nozzles. An inertial gas impactor collector 32, FIG. 1, 110, 106, FIG. 6, in the housing in the path of the accelerated gas-liquid stream causes liquid particle separation, as noted above. In the present application, a flow director directs flow through the housing from the inlet to the outlet along a flow path from upstream to downstream. Various embodiments are disclosed.

In FIGS. 7, 8, the flow director is provided by a flow controller in the form of a membrane 202 extending across the nozzles such as 104, FIG. 6, wherein the membrane deforms in response to increased flow. In one embodiment, the membrane deforms by rupturing. For example, membrane 202 may have a permanently open area at 204 providing continuous flow against inertial impactor collector 110, 106, FIG. 6, and may have a matrix 206 of a plurality of deformation sections such as 208, 210, etc., at respective nozzles 104. The deformation sections of the membrane are programmable or selectable to respond to different flow pressure, such that in response to increasing flow pressure, increasing numbers of membrane sections deform or rupture to provide flow through increasing numbers of respective nozzles 104. In the embodiment shown in FIGS. 7 and 8, membrane sections 208 are open, and membrane sections 210 remain closed, with the latter being programmed or selected to rupture or open at higher flow pressures.

In various applications, including for separating oil from blowby gas of an internal combustion engine, it is desired to provide increased separation efficiency early in the life of the engine without suffering objectionably high pressure drop late in the life of the engine including end-of-life condition of the engine. As an engine wears, more blowby gas is created, and the impactor in the inertial gas-liquid separator sees a larger flow and increased pressure from the crankcase. When this happens, the separator actually begins to perform with higher efficiency, but also has a larger pressure drop. Standard impactor separators must be designed to meet this end-of-life condition in order not to produce too high of a pressure drop. This means that the efficiency early in the life of the engine may not be optimized. Multiple stages are known to allow the impactor design to be optimized for several points in the life of the engine. For example, in one known embodiment, the blowby gas is exposed to fewer nozzles in the beginning when pressure and flow are lower. As pressure increases, more stages are opened. This means that efficiency can be high from the beginning of life, and pressure drop is controlled as the engine wears. It is also known to have one impactor stage that is constantly open to blowby gas flow, and one or more stages are that opened with relief valves as pressure increases. In one known embodiment, only the constant stage impactor is open at the beginning-of-life of the engine, and all stages will open by the end-of-life of the engine. It is also known to provide an inertial gas-liquid impactor separator with variable orifice jet nozzle structure having a variable orifice area. The present membrane flow director and flow controller accommodates these desirable objectives and is a further alternative to the described known subject matter. Rupture sections 208, 210 of matrix 206 respond to different flow pressure, such that in response to increasing flow pressure, increasing numbers of rupture sections 208, 210, etc., rupture to provide flow through increasing numbers of respective nozzles 30, FIG. 1, 104, FIG. 6. In one form, membrane 202 is a thermoelastomeric diaphragm. Membrane 202 may be upstream or downstream of the nozzle plate, and preferably extends along and parallel to and contiguous to the nozzle plate.

FIG. 9 shows a further embodiment with membrane 212 in housing or chimney 214 and upstream of one or more nozzles 216. Membrane 212 may rupture and/or deform and/or expand and/or enlarge, e.g. rupture at its center 218, which ruptured opening permits flow to the group of one or more nozzles 216. Portion 220 of the housing or chimney has no membrane thereacross, and the group of one or more nozzles 222 continually receives the gas-liquid stream. FIG. 10 shows a further embodiment with membrane 224 downstream of a group of one or more nozzles 226 and deformable or rupturable at a central section 228 to pass flow therethrough from the group of nozzles 226. The group of nozzles 230 have no membrane thereacross nor downstream thereof nor upstream thereof, and continually pass the gas-liquid stream therethrough. FIG. 11 shows a further embodiment with a membrane 232 immediately downstream of a group of one or more nozzles 234, with the membrane having individual rupturable or deformable sections 236, one for each nozzle. The group of nozzles 238 have no membrane thereacross, or the membrane already has pre-formed openings 240 enabling continuous flow through the group of nozzles 238.

In FIGS. 12-15, the flow director is provided by a flow controller in the form of a hinged plate 250, hinged at pivot or hinge 252, and extending across one or more nozzles 30, 104. In one embodiment, the hinged plate is provided by a cap having an aperture 254 therethrough providing a tea kettle valve. Aperture or opening 254 provides a permanently open area through which the gas-liquid stream continuously flows against the inertial impactor collector 32, 110, 106. As noted above, an internal combustion engine generates blowby gas as the noted gas-liquid stream, including increasing flow and pressure as the engine ages and wears. Flow rate can also change as a result of a changing engine condition, e.g. load, torque, speed, etc. The tea kettle valve aperture 254 maintains a desired pressure drop during an early-in-life condition of the engine at low blowby gas flow, as shown at the closed condition of the tea kettle valve in FIG. 14, wherein the gas-liquid stream flows only through opening or aperture 254, as shown at arrows 256. The tea kettle valve cap 250 opens, FIG. 15, in response to increasing blowby gas flow to maintain a designated pressure drop during a late-in-life condition of the engine at higher blowby gas flow. In FIG. 15, additional gas-liquid flow is shown at arrows 258. Cap 250 is movable to open and close nozzles 30, 104, FIGS. 14 and 15, respectively. The cap has the noted aperture 254 passing flow therethrough, including when the cap is closed, FIG. 14, to maintain a given pressure drop at a given low flow condition. The cap opens, FIG. 15, in response to increased flow to maintain a designated pressure drop at a designated higher flow condition.

FIGS. 16-19 show a further embodiment with a flow director provided by a flow controller in the form of a reed valve 270 having a normally closed condition, FIG. 16, and having an open condition, FIG. 17, in response to increasing flow. In an alternative, a flapper valve 272 may be hinged as shown at 274, and have a closed condition, FIG. 18, and an open condition, FIG. 19, in response to increased flow.

In the embodiments of FIGS. 20-25, the flow director is provided by a flow controller in the form of a variable actuator variably changing the distance between the nozzle 30, 104 and the inertial impactor collector 32, 110, 106. In FIG. 20, the variable actuator is provided by resiliently biasing, e.g. at spring 280, the inertial impactor collector 110, 106 to change the distance between nozzle 104 and inertial impactor collector 110, 106 in response to changing flow, e.g. increasing flow pushes harder against impaction media 110 and backing plate 106 to resiliently compress spring 280, thus increasing the distance 282 between nozzle 104 and inertial impactor collector 110, 106. In response to decreasing flow, spring 280 moves impactor collector 110, 106 downwardly to decrease distance 282. In FIG. 21, an upstream valve may be provided at 284 in housing or chimney 286 and biased downwardly to a closed position by spring 288 against valve seat 290. In response to increasing flow axially upwardly as shown at arrow 292, valve 284 moves upwardly off of valve seat 290, whereby the flow can then pass upwardly into plenum 294 and then to nozzle 104 to be accelerated thereby against impaction media 110. In FIG. 22, the housing or chimney 286 has a nozzle plate 296 which may be fixed or may be slidable to control the noted distance 282 to impaction media 110. Impaction media 110 may be mounted to the underside of an impactor collector plate 298 which may be biased downwardly by a spring such as 280, or may be free-floating and biased downwardly only by gravity. In the orientations of FIGS. 20-22, the gas-liquid stream is accelerated by the nozzles 104 along an axial direction 300 against inertial impactor collector 110. At least one of the nozzle and the inertial impactor collector is axially movable along axial direction 300 to change the axial distance 282 between the nozzle and the inertial impactor collector. In various embodiments as shown, one or both of the nozzle and the inertial impactor collector is movable along axial direction 300. In FIG. 23, inertial impactor collector 302 is mounted on a threaded shank 304 extending along an axis 306 along the noted axial direction and rotates about axis 306 to change the noted axial distance 282 between inertial impactor collector 302 and nozzle 104. In FIG. 24, the nozzle is further provided by a plurality of tubular members 308, 310, etc. concentric about and telescopically extending along axis 306 and axially telescopically extensible and retractable to change the axial distance 282 between inertial impactor collector 110 and the nozzle. In some embodiments, it may be desirable to provide the variable actuator as a resiliently biased nozzle, as shown at biasing spring 312 in FIG. 25.

In FIG. 26, the flow director is provided by a curved nozzle plate 320 having a plurality of nozzles 104, and preferably a curved inertial impactor collector plate 322. The gas-liquid stream flows axially along axial direction 324 to a plenum 326 about which curved nozzle plate 320 forms an arc, whereafter the gas-liquid stream diverges in a fan-shape along a plurality of nonparallel vectors 328, 330, 332, etc., against curved arcuate nozzle plate 320, with a given vector such as 328 continuing axially along the noted axial direction, and with other vectors such as 330, 332 extending obliquely relative to axial direction 324.

In FIGS. 27-30, the flow director is provided by a pair of combined nozzle/impactor plates 340 and 342 facing each other across a gap 344. First nozzle/impactor plate 340 has at least a first acceleration nozzle 346 therethrough. Second nozzle/impactor plate 342 has at least a second acceleration nozzle 348 therethrough. Preferably, a plurality of nozzles are formed through each of plates 340 and 342. The noted first acceleration nozzle 346 accelerates flow therethrough as shown at arrow 350 and across gap 344 against second nozzle/impactor plate 342 providing a first inertial impactor collector causing liquid particle separation. The noted second acceleration nozzle 348 accelerates flow therethrough as shown at arrow 352 and across gap 344 against first nozzle/impactor plate 340 providing a second inertial impactor collector causing liquid particle separation. Flow across gap 344 from first acceleration nozzle 346 to second nozzle/impactor plate 342 is along a first direction, e.g. downwardly in FIGS. 27, 28, as shown at arrow 350. Flow across gap 344 from second acceleration nozzle 348 to first nozzle/impactor plate 340 is along a second direction, e.g. upwardly in FIGS. 27, 28 as shown at arrow 352. The noted second direction 352 is opposite to the noted first direction 350. First nozzle/impactor plate 340 provides both an acceleration nozzle and an inertial impactor collector, namely: a) the acceleration nozzle 346 for flow along the noted first direction 350; and b) the inertial impactor collector for flow along the noted second direction 352. Second nozzle/impactor plate 342 provides both an acceleration nozzle and an inertial impactor collector, namely: a) the acceleration nozzle 348 for flow along the noted second direction 352; and b) the inertial impactor collector for flow along the noted first direction 350. First nozzle/impactor plate 340 has an upstream surface 354 and a distally oppositely facing downstream surface 356. Second nozzle/impactor plate 342 has an upstream surface 358 and a distally oppositely facing downstream surface 360. Downstream surfaces 356 and 360 of the first and second nozzle/impactor plates 340 and 342, respectively, face each other across gap 344. The gas-liquid stream 94 flows axially along axial direction 362 to a pre-separation plenum 364 in housing 366, and flows to upstream surface 354 of first nozzle/impactor plate 340 and to upstream surface 358 of second nozzle/impactor plate 342 and then transversely in opposite directions 350 and 352 through respective first and second acceleration nozzles 346 and 348 and into gap 344. The flow exits gap 344 along axial direction 362 through outlet 368 after liquid particle separation at facing downstream surfaces 356 and 360 of first and second nozzle/impactor plates 340 and 342, respectively, providing the noted first and second inertial impactor collectors, respectively. First and second nozzle plates 340 and 342 have respective first and second nozzles 346 and 348 therethrough, with first nozzle plate 340 being an inertial impactor collector for second nozzle 348, and with second nozzle plate 342 being an inertial impactor collector for first nozzle 346.

In FIG. 31, the separator is provided for an internal combustion engine having a valve cover 380. An outer cover 382 is provided over at least a portion of and is spaced outwardly of valve cover 380. Outer cover 382 has an inner surface 384 spaced from valve cover 380 by a gap 386 through which the gas-liquid stream is accelerated by nozzle 104 which is provided through valve cover 380. Inner surface 384 of outer cover 382 provides an inertial impactor collector and causes liquid particle separation. In one embodiment, at least one of the inner surface 384 of outer cover 382 and valve cover 380 at nozzle 104 is convexly curved toward the other of inner surface 384 of outer cover 382 and valve cover 380 at nozzle 104. This enables selection of the distance across the gap or spacing at 386. This also can accommodate an adjacent external part of irregular shape, e.g. at 388.

In FIGS. 32, 33, the flow director is provided by a resiliently biased plunger or valve, e.g. 390, having a valve face 392 engageable with a valve seat 394 having a self-seating tolerance-accommodating configuration. Housing 396 has a primary always-open flow passage 398 supplying flow to nozzles at 104, and has a secondary flow passage 400 controlled by plunger or valve 390 supplying flow to nozzles at 104a. In the preferred embodiment, valve face 392 and valve seat 394 engage along a tapered surface, e.g. the outer arcuate surface of a ball provided by ball plunger 390. In another embodiment, the plunger is provided by a bowl 402, FIG. 33, which may be biased downwardly by gravity as in FIG. 32, or may be additionally biased by a spring such as 404. Plungers 390, 402 provide a relief valve enabling increased flow at increasing pressure.

In FIG. 34, first and second flow paths 410 and 412 are provided in housing 414. First flow path 410 has a first set of one or more nozzles 416 receiving the gas-liquid stream 94 from inlet 96, which may be controlled by an inlet valve 418 biased by spring 420. The gas-liquid stream in first flow path 410 is accelerated through the first set of one or more nozzles 416. Second flow path 412 has a second set of one or more nozzles 422 receiving the gas-liquid stream from first flow path 410 and accelerating the gas-liquid stream through the second set of one or more nozzles 422 and against inertial impactor collector 424. First and second flow paths 410 and 412 are in series. Second flow path 412 may include an entrance valve 426 biased by spring 428. A third flow path 430 is provided in the housing and has a third set of one or more nozzles 432 accelerating the gas-liquid stream therethrough, with the third flow path being in parallel with at least one of the first and second flow paths. In one embodiment, flow paths A, B, C and D in the housing provide cumulatively increasing flow, wherein flow path A is always open and provides inertial impaction separation at an inertial impactor collector E, and having an actuator F opening flow path B to flow to flow path C in response to increasing pressure, wherein flow path C provides inertial impaction separation at an inertial impactor collector G, and having an actuator H opening flow path D to flow from flow path B, wherein flow path D provides inertial impaction separation at inertial impactor collector G. Flow paths C and D have upstream ends meeting at a common junction 431 at a downstream end of flow path B, and wherein flow from flow path B splits at common junction 431 into a first flow branch 433 flowing to flow path C, and a second flow branch 435 flowing to flow path D. One or more acceleration nozzles 416 at common junction 431 accelerates flow from flow path B to flow paths C and D at the noted first and second flow branches, respectively. In a further embodiment, third flow path 430 is in parallel with first flow path 410, and the third set of one or more nozzles 432 accelerates the gas-liquid stream therethrough against a second inertial impactor collector 434 causing liquid particle separation. In a further embodiment, a fourth flow path may be provided at 436 and have a fourth set of one or more nozzles 438 accelerating the gas-liquid stream therethrough, with the fourth flow path in parallel with the noted second flow path, and the noted fourth set of one or more nozzles accelerating the gas-liquid stream therethrough against inertial impactor collector 424. A yet further flow path may be provided at 440 and having a further set of one or more nozzles 442 accelerating the gas-liquid stream therethrough against inertial impactor collector 424. The various flow paths provide flow director structure therethrough guiding flow to the next flow path and/or to a respective inertial impactor collector, etc.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An inertial gas-liquid impactor separator for removing liquid particles from a gas-liquid stream comprising a housing having an inlet for receiving a gas-liquid stream, and an outlet for discharging a gas stream, at least one nozzle in said housing receiving said gas-liquid stream from said inlet and accelerating said gas-liquid stream through said nozzle, an inertial impactor collector in said housing in the path of said accelerated gas-liquid stream and causing liquid particle separation, wherein flow through said housing flows from said inlet to said outlet along a flow path from upstream to downstream, wherein said gas-liquid stream is accelerated by said nozzle along an axial direction against said inertial impactor collector, a biasing member biasing said inertial impactor collector axially towards said nozzle, wherein one of said housing and said inertial impactor collector in sectional view includes a pair of integrally formed axial extension portions extending axially toward the other of said housing and said inertial impactor collector and partially along said biasing member and having axially facing stop surfaces limiting the amount of axial travel of said inertial impactor collector away from said nozzle.

2. The inertial gas-liquid impactor separator according to claim 1 wherein said axial extension portions are on said housing on laterally distally opposite sides of said biasing member therebetween.

3. The inertial gas-liquid impactor separator according to claim 1 wherein said axial extensions portions are on said inertial impactor collector on laterally distally opposite sides of said biasing member therebetween.

4. An inertial gas-liquid impactor separator for removing liquid particles from a gas-liquid stream comprising a housing having an inlet for receiving a gas-liquid stream, and an outlet for discharging a gas stream, at least one nozzle in said housing receiving said gas-liquid stream from said inlet and accelerating said gas-liquid stream through said nozzle, an inertial impactor collector in said housing in the path of said accelerated gas-liquid stream and causing liquid particle separation, wherein flow through said housing flows from said inlet to said outlet along a flow path from upstream to downstream, wherein said gas-liquid stream is accelerated by said nozzle along an axial direction against said inertial impactor collector, a first biasing member biasing said inertial impactor collector axially towards said nozzle, a valve upstream of said nozzle and controlling flow to said nozzle, and a second biasing member biasing said valve towards a closed position and responding to increasing flow to move said valve to an open position.

5. The inertial gas-liquid impactor separator according to claim 4 wherein said second biasing member is coaxially aligned with said first biasing member.

6. The inertial gas-liquid impactor separator according to claim 4 wherein said second biasing member extends axially between said nozzle and said valve.

7. The inertial gas-liquid impactor separator according to claim 6 wherein said first biasing member, said second biasing member, said nozzle, and said valve are all coaxially aligned.

8. The inertial gas-liquid impactor separator according to claim 4 comprising a chimney containing said valve and said second biasing member, said chimney having first and second distally opposite axial ends, said valve having a valve seat at said first axial end, said nozzle being at said second axial end.

9. An inertial gas-liquid impactor separator for removing liquid particles from a gas-liquid stream comprising a housing having an inlet for receiving a gas-liquid stream, and an outlet for discharging a gas stream, at least one nozzle in said housing receiving said gas-liquid stream from said inlet and accelerating said gas-liquid stream through said nozzle, an inertial impactor collector in said housing in the path of said accelerated gas-liquid stream and causing liquid particle separation, wherein flow through said housing flows from said inlet to said outlet along a flow path from upstream to downstream, wherein said gas-liquid stream is accelerated by said nozzle along an axial direction against said inertial impactor collector, a biasing member biasing said inertial impactor collector axially towards said nozzle, wherein said inertial impactor collector has a central portion axially interposed between said biasing member and said nozzle, and an outer V-shaped portion having first and second legs meeting at an apex, wherein said nozzle and said inertial impactor collector are axially spaced by a gap therebetween, said apex is laterally spaced from said gap, and flow through said housing flows along said first leg then around said apex then along said second leg.

10. An inertial gas-liquid impactor separator for removing liquid particles from a gas-liquid stream comprising a housing having an inlet for receiving a gas-liquid stream, and an outlet for discharging a gas stream, at least one nozzle in said housing receiving said gas-liquid stream from said inlet and accelerating said gas-liquid stream through said nozzle, an inertial impactor collector in said housing in the path of said accelerated gas-liquid stream and causing liquid particle separation, wherein flow through said housing flows from said inlet to said outlet along a flow path from upstream to downstream, wherein said gas-liquid stream is accelerated by said nozzle along an axial direction against said inertial impactor collector, wherein said housing has a U-shaped portion in sectional view having a first bight and first and second legs extending axially therefrom, and said housing has an inverted U-shaped portion in sectional view having a second bight and third and fourth legs extending axially therefrom.

11. The inertial gas-liquid impactor separator according to claim 10 wherein said first and second housing portions engage in opposing telescoping relation with said first and second bights axially distally opposed and axially spaced by a plenum therebetween, and said first and second legs engaging said third and fourth legs, respectively, in sliding axially translational relation.

12. The inertial gas-liquid impactor separator according to claim 11 wherein said inlet is at said first bight.

13. The inertial gas-liquid impactor separator according to claim 11 wherein said nozzle is at said second bight.

14. The inertial gas-liquid impactor separator according to claim 11 comprising a biasing member in said plenum and extending axially between said first and second bights.

15. An inertial gas-liquid impactor separator for removing liquid particles from a gas-liquid stream comprising a housing having an inlet for receiving a gas-liquid stream, and an outlet for discharging a gas stream, at least one nozzle in said housing receiving said gas-liquid stream from said inlet and accelerating said gas-liquid stream through said nozzle, an inertial impactor collector in said housing in the path of said accelerated gas-liquid stream and causing liquid particle separation, wherein flow through said housing flows from said inlet to said outlet along a flow path from upstream to downstream, wherein said gas-liquid stream is accelerated by said nozzle along an axial direction against said inertial impactor collector, said nozzle is provided on a nozzle plate having an upstream facing side and an opposite downstream facing side, wherein said downstream facing side faces said inertial impactor collector, and comprising a biasing member extending axially from said upstream facing side.

16. The inertial gas-liquid impactor separator according to claim 15 wherein said housing has a U-shaped portion in sectional view having a first bight and first and second legs extending axially therefrom, and an inverted U-shaped portion in sectional view having a second bight and third and fourth legs extending axially therefrom, wherein said first and second housing portions engage in opposing telescoping relation with said first and second bights axially distally opposed and axially spaced by a plenum therebetween, and said first and second legs engaging said third and fourth legs, respectively, in sliding axially translational relation, wherein said second bight is said nozzle plate, and said biasing member is in said plenum and extends axially between said first and second bights.

17. An inertial gas-liquid impactor separator for removing liquid particles from a gas-liquid stream comprising a housing having an inlet for receiving a gas-liquid stream, and an outlet for discharging a gas stream, at least one nozzle in said housing receiving said gas-liquid stream from said inlet and accelerating said gas-liquid stream through said nozzle, an inertial impactor collector in said housing in the path of said accelerated gas-liquid stream and causing liquid particle separation, wherein flow through said housing flows from said inlet to said outlet along a flow path from upstream to downstream, a valve upstream of said nozzle and controlling flow to said nozzle, said valve having a valve face engageable with a valve seat, at least one of said valve face and said valve seat having a self-seating tolerance-accommodating configuration, wherein said valve comprises a ball or a bowl.

18. The inertial gas-liquid impactor separator according to claim 17 wherein said valve face and said valve seat engage along a tapered surface.

19. The inertial gas-liquid impactor separator according to claim 18 wherein said valve comprises a ball.

20. The inertial gas-liquid impactor separator according to claim 18 wherein said valve comprises a bowl.

21. The inertial gas-liquid impactor separator according to claim 18 wherein said valve is a relief valve.

22. The inertial gas-liquid impactor separator according to claim 18 wherein said valve is gravity biased to a closed position.

23. The inertial gas-liquid impactor separator according to claim 18 comprising a biasing member biasing said valve to a closed position.

* * * * *